United States Patent
Carrasco

(10) Patent No.: US 7,635,460 B2
(45) Date of Patent: Dec. 22, 2009

(54) PROCESS FOR DISSOLVING SULFUR ORE USING DIARYL DISULFIDE

(76) Inventor: Robert M. Carrasco, 1901 NW. 100 St., Vancouver, WA (US) 98685

( * ) Notice: Subject to any disclaimer, the term of this patent is extended or adjusted under 35 U.S.C. 154(b) by 0 days.

(21) Appl. No.: 12/188,152

(22) Filed: Aug. 7, 2008

(65) Prior Publication Data

US 2009/0162270 A1     Jun. 25, 2009

Related U.S. Application Data

(60) Provisional application No. 60/965,131, filed on Aug. 17, 2007.

(51) Int. Cl.
*C01B 17/02* (2006.01)
*C01B 17/06* (2006.01)

(52) U.S. Cl. .................. 423/571; 23/293 S; 23/308 S; 299/5; 299/16; 299/95; 241/24.1

(58) Field of Classification Search ............... 423/571; 23/293 S, 308 S; 299/5, 16, 95; 241/24.1, 241/38; 422/129, 262
See application file for complete search history.

(56) References Cited

U.S. PATENT DOCUMENTS

| | | | |
|---|---|---|---|
| 2,027,357 A | | 1/1936 | Moses et al. |
| 3,063,817 A | | 11/1962 | Simpson |
| 3,512,943 A | * | 5/1970 | Dubow ................. 422/262 |
| 3,531,160 A | * | 9/1970 | Fisher ...................... 299/5 |
| 3,846,311 A | * | 11/1974 | Sharp et al. ............ 507/250 |
| 3,939,256 A | | 2/1976 | Kazel |
| 4,722,832 A | | 2/1988 | Weston et al. |
| 4,923,482 A | | 5/1990 | Menar |
| 5,096,571 A | | 3/1992 | Womack et al. |
| 5,585,334 A | | 12/1996 | Shaw |

OTHER PUBLICATIONS

McIntyre, L., "Rapture of the Heights," *Américas*, vol. 45, No. 6, pp. 6-13 (Nov./Dec. 1993).
Voorhees, R.J. et al., "Diaryl disulfide solves sulfur-deposition problems at sour gas field," *Oil & Gas Journal*, vol. 89, No. 35, pp. 85-89 (Sep. 2, 1991).

* cited by examiner

*Primary Examiner*—Timothy C Vanoy
(74) *Attorney, Agent, or Firm*—Klarquist Sparkman, LLP

(57) ABSTRACT

Embodiments of a sulfur extraction process comprise treating mined sulfur ore with a disulfide oil to dissolve the sulfur in the ore. The process occurs at a temperature less than a temperature sufficient to melt sulfur. The sulfur crystals may be isolated by cooling the dissolved sulfur to a temperature sufficient to crystallize the sulfur. An apparatus for extracting sulfur from sulfur ore comprises a first receptacle for contacting a disulfide oil with mined sulfur ore at an elevated temperature sufficient to dissolve sulfur, a second receptacle coupled to the first receptacle for cooling dissolved sulfur such that sulfur crystals form, and a filtration apparatus coupled to the second receptacle for isolating the sulfur crystals. Solvents used in the apparatus may be recycled.

19 Claims, 2 Drawing Sheets

PROCESS FOR DISSOLVING SULFUR ORE USING DIARYL DISULFIDE

CROSS-REFERENCE TO RELATED APPLICATION

This application claims the benefit of U.S. Provisional Application No. 60/965,131, filed Aug. 17, 2007, which is incorporated herein by reference in its entirety.

FIELD

The present application is directed to the extraction of sulfur from sulfur ore, such as the extraction of sulfur from igneous rock in mining.

BACKGROUND

Elemental sulfur is typically found naturally in salt domes, volcanic deposits, and some deposits of calcite, gypsum, and anhydrite. The Frasch Process is a well-known method for sulfur recovery in which molten sulfur is pumped directly out of the ground. In the Frasch Process, pressurized water is superheated to a temperature sufficient to melt or liquefy sulfur. The superheated water is introduced into beds of sulfur or into sulfur bearing rock deep in the earth through a system of pipes inserted into drilled holes. Molten sulfur is then pumped to the surface through a system of compressed air pipes. The Frasch Process is well-known for relatively inexpensive extraction of high purity sulfur. Sulfur deposits in volcanic rock, however, are typically not amenable to the Frasch Process. For instance, the efficiency of the Frasch Process is compromised when sulfur deposits are located near to the surface of the ground or when less concentrated deposits are dispersed in rock or other impurities. Such situations can be common in volcanic sulfur deposits.

Sulfur is typically extracted from volcanic deposits by mining the sulfur ore and "melting out" the sulfur from the ore. For example, using the Sicilian process, sulfur ore is ignited and a portion of the sulfur serves as a fuel source to heat and liquefy the remaining sulfur in the ore. The molten sulfur is then recovered and cooled. The Sicilian process, however, tends to be limited to certain types of sulfur deposits. In addition, burning the sulfur generates noxious gas byproducts and limits the amount of recoverable sulfur. Vaporization methods for sulfur extraction involve heating ground ore to a temperature sufficient to vaporize the sulfur and then extracting the sulfur gas. In an autoclaving method, superheated water and steam are used to liquefy the sulfur and then the liquefied sulfur is extracted. These and other methods of sulfur recovery are described in more detail elsewhere, such as in U.S. Pat. Nos. 4,923,482, 4,722,832, 5,096,571, and 3,939,256.

Conventional sulfur recovery methods typically involve melting, vaporizing, or otherwise converting sulfur into a molten state. Because molten sulfur tends to adhere to gangue and other impurities in the ore, the purity of the sulfur recovered by these methods can be limited and additional purification processing may be necessary. In addition, pressurized tanks and/or temperatures above the boiling point of water, typically between 120° C.-140° C., are needed to melt sulfur. Because heating and pressurizing steps are energy intensive and costly, sulfur extraction techniques have had limited success at efficiently recovering sulfur from volcanic deposits. Therefore, there exists a need for a more cost-effective method of sulfur extraction from sulfur ore.

SUMMARY

The extraction of sulfur from sulfur ore is described. A process for extracting sulfur from sulfur ore comprises contacting crushed ore with a solvent, such as a disulfide, in particular a hot disulfide oil, dissolving or dispersing sulfur from the ore into the solvent to generate a pregnant solution, lowering the temperature of the solution sufficient to crystallize the dissolved sulfur, and extracting the sulfur crystals. In some embodiments of the disclosed process, the disulfide comprises diaryl disulfide, alkyl aryl disulfide, or combinations thereof. The process is useful for extracting sulfur from mixtures of elemental sulfur and igneous rock found, for example, in extinct volcanoes. The chemical solvents used in the extraction process are preferably reused, enhancing the efficiency of the overall process.

In one embodiment of the disclosed process, sulfur ore comprising a solid mixture of rock and elemental sulfur is provided and crushed. Crushed sulfur ore is contacted with a heated disulfide solution comprising diaryl disulfide and alkyl aryl disulfide, thereby creating a slurry. The slurry is agitated for a time and at a temperature sufficient to dissolve the elemental sulfur in the disulfide solution. A ground rock component and a disulfide solution containing dissolved sulfur are separated from the slurry. The ground rock component is contacted with toluene thereby creating a toluene wash solution containing ground rock. The toluene wash solution is processed to isolate toluene and the disulfide solution such that the toluene and the disulfide solution can be recycled. The disulfide solution containing dissolved sulfur is cooled to a temperature sufficient to crystallize the dissolved sulfur, thereby creating a diaryl disulfide solution containing sulfur crystals. The sulfur crystals are separated from the disulfide solution and at least a portion of the disulfide solution is recycled. The sulfur crystals are contacted with toluene, thereby creating a toluene wash solution containing sulfur crystals, and the sulfur crystals are than extracted. The toluene wash solution is processed to isolate the disulfide solution from the toluene, and at least a portion of the isolated disulfide solution and the isolated toluene are recycled.

Typically, temperatures sufficient to produce steam or to melt sulfur are not necessary for sulfur recovery using the disclosed process. Therefore, the methods described represent a cost sensitive approach to extracting sulfur from deposits that typically require energy intensive recovery methods. Apparatus for performing sulfur extraction methods are also described.

The foregoing and other objects, features, and advantages will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" means mechanically coupled or connected and does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description may use terms such as "produce" and "provide" to describe the disclosed methods. These terms are high-level abstractions of the actual operations that are performed. The actual operations that correspond to these terms will vary depending on the particular implementation and are readily discernible by one of ordinary skill in the art.

Figure 2:
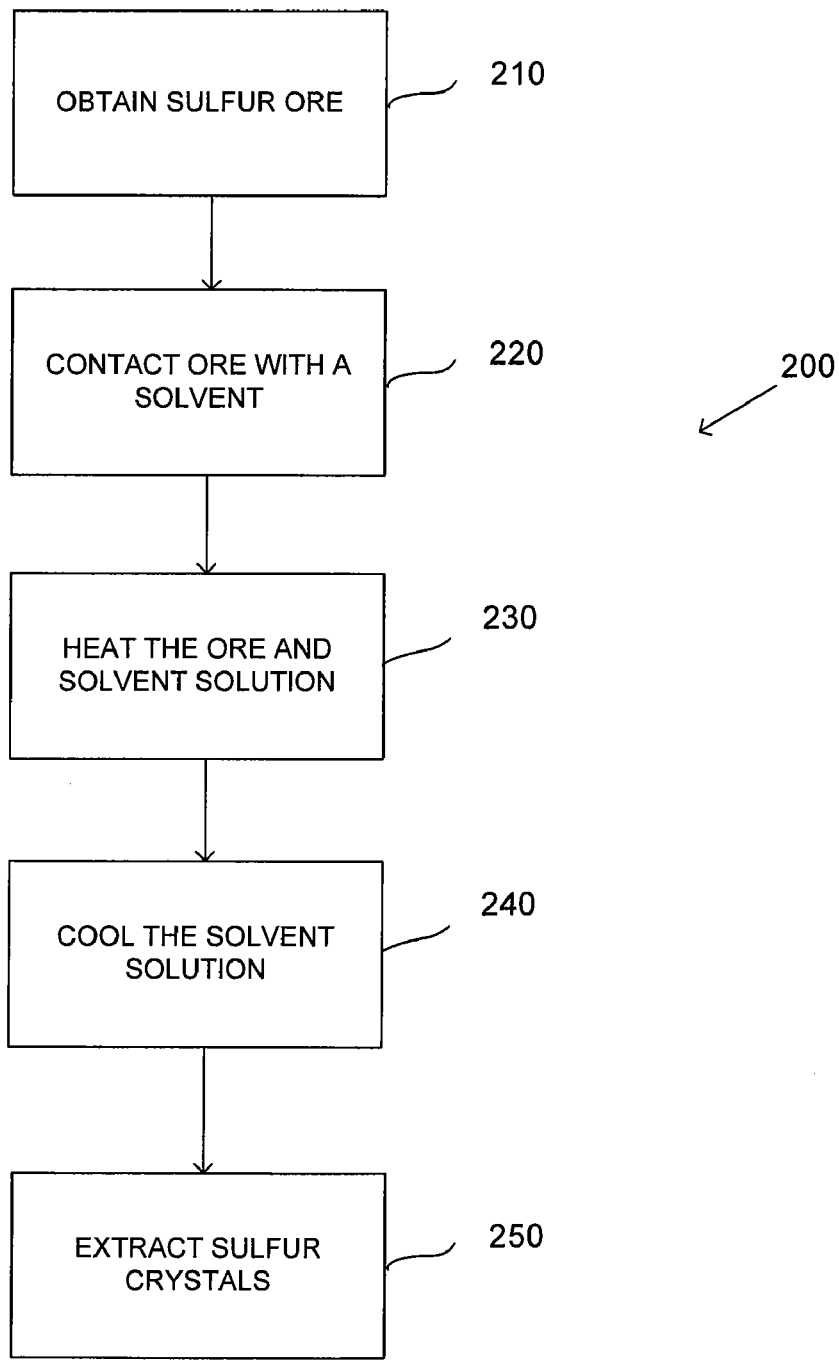
FIG. 2 is a flow-chart illustrating a sulfur extraction process.

An embodiment of a method 200 for the extraction of sulfur from sulfur ore is illustrated in FIG. 2. In a step 210, sulfur ore is obtained. Step 210 may include additional steps such as mining the sulfur ore, disaggregating the sulfur ore from rock, and crushing or grinding the sulfur ore. In a step 220, sulfur ore is contacted with a first solvent. Typically, the first solvent includes a sulfide and/or a disulfide. Sulfides and disulfides that can dissolve sulfur at a low temperature, such as below 100° C., are preferred. For example, disulfide oils, such as diaryl disulfide, alkyl aryl disulfide, and combinations thereof are particularly useful for dissolving elemental sulfur from sulfur ore. In general, the first solvent typically comprises between about 60% and about 100% diaryl disulfide and between about 0% and about 40% alkyl aryl disulfide. In a particular example, the first solvent comprises about 86% diaryl disulfide and about 14% alkyl aryl disulfide. In another example, the first solvent consists essentially of diaryl disulfide. Diaryl disulfide is advantageous over disulfides such as carbon disulfide, because fire, explosion, and toxicity hazards are reduced. Diaryl disulfide may be purchased from the oil refining industry.

In a step 230, the first solvent and sulfur ore mixture is heated to a temperature sufficient to dissolve the sulfur. The sufficient temperature is based on the dissolving properties of the first solvent and is preferably less than the temperature sufficient to melt or vaporize sulfur and well below the ignition temperature of sulfur. Typically, the first solvent and sulfur ore mixture is heated to a temperature less than about 115° C. and greater than about 50° C. In some examples, the first solvent is heated to a temperature between about 75° C. and about 100° C., such as between about 80° C. and about 90° C. In a particular example, the first solvent is heated to a temperature of about 90° C. Step 230 can include additional steps such as agitating the first solvent and sulfur ore mixture to facilitate the sulfur dissolution and separating a ground rock component from the first solvent and dissolved sulfur mixture.

In a step 240, the first solvent and dissolved sulfur mixture is cooled to a temperature sufficient to crystallize the sulfur. The temperature sufficient to crystallize the sulfur can depend on properties of the first solvent. Typically, the mixture is cooled to a temperature less than about 50° C. and greater than about 10° C., such as between about 20° C. and about 45° C., or between about 30° C. and about 40° C. In a particular example, the mixture is cooled to a temperature of about 40° C., while in another example, the mixture is cooled to a temperature of about 20° C.

In a step 250, the sulfur crystals are extracted from the mixture. The extracted crystals can be washed with a second solvent to at least partially remove remainder of the first solvent from the crystals. For example, organic solvents are particularly useful for dissolving the disclosed organic sulfides and disulfides. Thus, typically, the second solvent is an organic solvent. In some examples, particularly when the first solvent includes aryl disulfide, the second solvent is an aromatic solvent, such as toluene, xylenes or the like. Preferably, the first and second solvents are recycled or reused in the sulfur extraction process. For example, the sulfur crystal wash can be distilled in order to separate the first and second solvents. The isolated sulfur crystals may be further processed to prepare the sulfur for sale or for use in a particular application. For example, the crystals can be ground into a powder.

Figure 1:
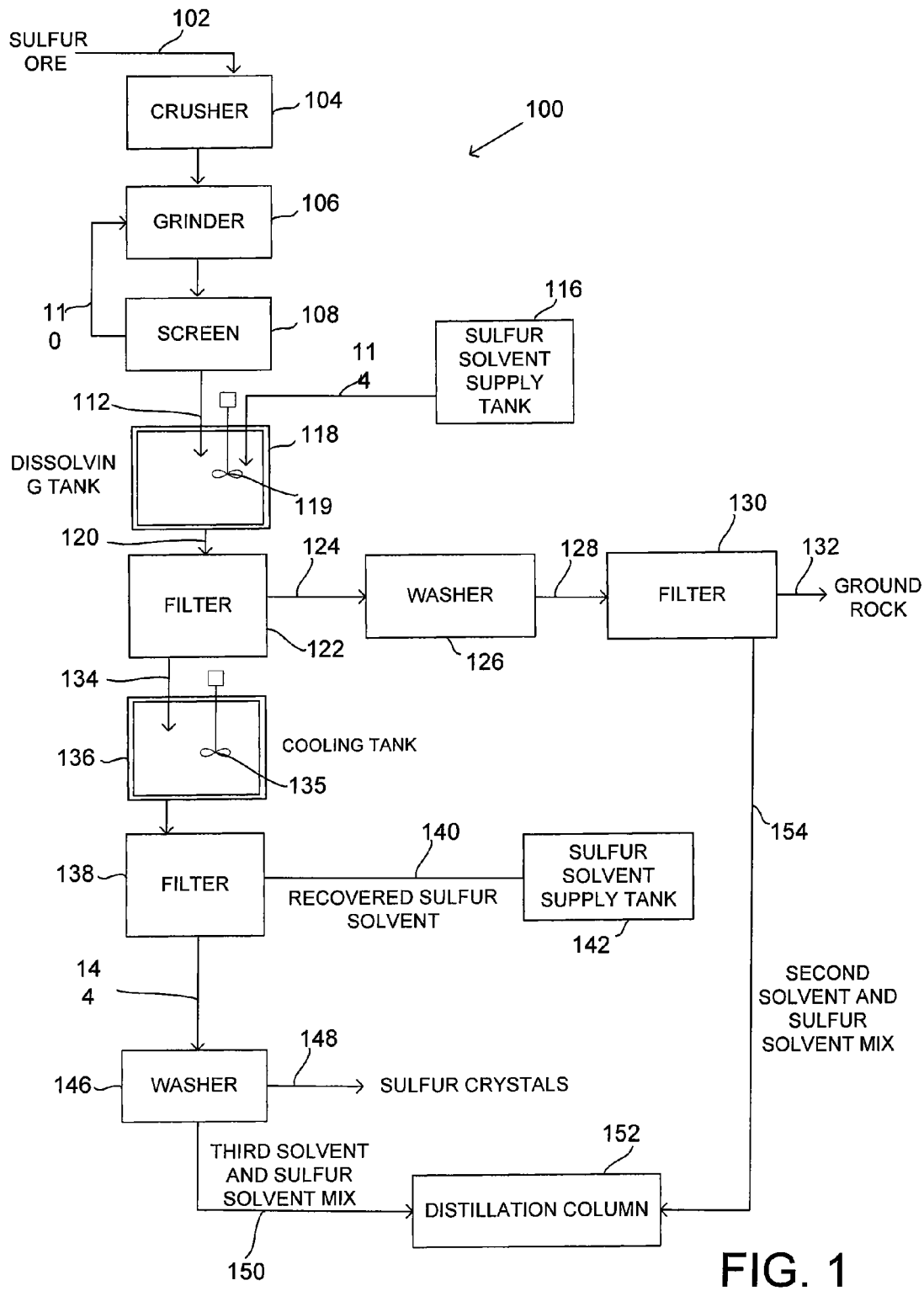
FIG. 1 is a schematic of a sulfur extraction system.

A representative embodiment of a system 100 for extracting sulfur from sulfur ore is shown schematically in FIG. 1. FIG. 1 also illustrates acts of the associated methods. In the system 100, sulfur ore is fed, as indicated at line 102, into a crusher 104. The sulfur ore is typically obtained through mining and comprises igneous rock and sulfur, although the sulfur ore may be volcanic or non-volcanic in origin. The sulfur ore may be disaggregated from larger pieces of rock before passing into the crusher. Typically, the ore has an average sulfur content of about 30% to 50%, and often between about 30% and 35%, depending on the methods used for ore selection and the source of the ore. The ore may be pre-crushed, pre-ground, or otherwise reduced in size at a location that is separate from the system 100. The crusher 104 crushes the sulfur ore and then passes the crushed ore into a grinder 106, where the ore is ground. The system 100 may include crushers and/or grinders in addition to crusher 104 and grinder 106, such as a primary and secondary crusher or grinder. Alternatively, the system may have fewer crushers or grinders.

The crushed and ground ore is then sorted for size, such as by using a mesh screen 108. Crushed ore that is of a size small enough to pass through the screen 108 is conveyed to a dissolving tank 118, as indicated at line 112. Ore of a size too large to pass through the screen 108 can be recycled through the grinder 106 to be reground, as indicated at line 110. For example, for a screen 108 with a standard 200 mesh, ground ore of a size greater than 200 mesh is recycled, while ground ore of a size less than 200 mesh is conveyed from the screen 108 to the dissolving tank 118. Ore may be ground more than once as necessary to reduce its size such that the crushed ore can pass through screen 108. The mesh size of the screen 108 is typically based on the size and concentration of the sulfur deposits in the sulfur ore, and thus can be adjusted for a particular embodiment. For example, screen sizes between 100 mesh and 200 mesh have been found to be sufficient for sulfur ore having an average sulfur content of about 35%. The sulfur ore can be ground to smaller or larger sizes than these, but additional or reduced grinding may not be desirable when it results in increased production costs.

The sulfur content of the ore entering the dissolving tank 118 may be monitored and controlled to maintain a particular average sulfur content. For example, the crushed sulfur ore may be periodically sampled along line 112 and the average sulfur content determined. The system 100 can also contain multiple tanks 118 for simultaneously processing batches of sulfur ore having different sulfur content. The ore can also be sent through additional crushers after the sulfur content is determined and before it is fed into the dissolving tank 118.

A solvent supply tank 116 stores a solvent that is capable of dissolving sulfur and that is provided to the dissolving tank 118. The solvent typically includes a disulfide. For example, in some embodiments the solvent is a disulfide oil comprising diaryl disulfide, alkyl aryl disulfide, or combinations thereof. In addition to a disulfide, the solvent may contain an additional sulfur solvent or mixture of solvents, including, without limitation, organic solvents known to those of skill in the art. The sulfur solvent from the supply tank 116 is supplied to the tank 118 through a line 114, and the sulfur solvent may be heated in the supply tank 116 before added to the tank 118. The sulfur solvent contacts the crushed ore in the tank 118 to create a slurry. The amount of solvent added to the tank 118 is generally sufficient to create a mixture that can be agitated and is based on the sulfur content of the ore. For an example batch of ore with an average sulfur content of about 35%, about two-thirds of the slurry mixture, by volume, comprises solvent. For batches of ore with a higher sulfur content, the portion of the solution comprising solvent may be larger than two-thirds of the solution by volume.

In some embodiments, the tank 118 is capable of being heated and having the temperature of its contents monitored. For example, the tank 118 may have a steam jacket or hot water may be circulated through pipes attached to the outside of the tank. The slurry is heated and maintained at a temperature that is less than the melting point and the ignition temperature of sulfur but sufficient for the sulfur solvent to dissolve the sulfur. Typically, the temperature is between about 50° C. and about 100° C., such as between about 70° C. and about 90° C. Desirably, the temperature is between about 80° C. and about 90° C.

The slurry in the tank 118 may be agitated in order to facilitate the dissolution of the sulfur, such as, e.g., by use of a mixing element 119. The slurry is typically agitated for between 15 minutes and 2 hours, such as between 30 minutes and 1 hour, though the slurry may be agitated for longer than 2 hours. The slurry is typically removed from the dissolving tank 118 after the sulfur has sufficiently dissolved, which is based at least partially on the temperature of the sulfur solvent, the sulfur content of the ore, and the size of the particles of the crushed ore. The temperature and the size of the crushed ore can be adjusted and tuned according to a particular embodiment and to achieve a particular system efficiency. For example, increasing the temperature of the slurry can increase the dissolving capacity of the solvent and reduce the agitation time.

The slurry in tank 118 comprises a ground rock component and a pregnant solution which comprises the sulfur solvent and the dissolved sulfur. In the system 100, the ground rock is separated from the pregnant solution to facilitate the extraction of the sulfur from the solution. The slurry passes from the tank 118 through a line 120 into a filter apparatus 122. The filter apparatus can be a conventional filtering system, such as a vacuum filter centrifuge. The filter apparatus 122 separates the ground rock from the pregnant solution. The separated ground rock passes through a line 124 to a washer 126 where the rocks are placed in contact with a second solvent. The second solvent is chosen such that it dissolves the sulfur solvent. For example, the washer 126 may be a sealed tank containing toluene. When the sulfur solvent is sufficiently removed from the rocks, the ground rock and wash solution pass from the washer 126 through a line 128 to a filter apparatus 130, such as a vacuum filter centrifuge. The filter apparatus 130 separates clean ground rock 132 from the wash solution 154, which at this point comprises sulfur solvent solution removed from the ground rocks and the second solvent.

The solution 154 may then be processed to isolate and recover the solvents. For example, the toluene or other second solvent and the sulfur solvent solution may be subjected to a distillation, such as in a distillation column 152. The isolated second solvent and sulfur solvent may be reused in the sulfur extraction system 100 or recycled in another manner. Also, the processing to isolate the solvents may occur at the same location as the sulfur extraction system 100 or at a separate location.

Returning to the output of the filter apparatus 122, the pregnant solution that has been separated is fed from the filter 122 to a cooling tank 136, as indicated at line 134. The cooling tank 136 may contain an agitator 135, and is capable of cooling the contents of the tank. For example, the tank may have a cold water jacket, or cold water may be circulated through pipes attached to the outside of the tank. The pregnant solution is cooled in the tank 136 to a temperature sufficient to crystallize the dissolved sulfur. Typically, cooling the solution to a temperature less than approximately 50° C., such as between about 20° C. and about 40° C., is sufficient to crystallize the sulfur. The sulfur crystals typically have different characteristics, such as crystal size and shape, based on the rate at which the solution is cooled and the temperature to which it is cooled. The crystallization process can be substantially controlled by adjusting the cooling process.

After sufficient crystallization has occurred, the sulfur crystals and sulfur solvent are conveyed from the tank 136 into a filter apparatus 138, such as a vacuum filter centrifuge. The filter apparatus 138 separates the sulfur crystals from the solvent. The solvent which has been recovered from the filtering (line 140) can be collected in a solvent supply tank 142. The solvent supply tank 142 may be the same as the tank 116 or the tank 142 may be connected to tank 116. The recovered solvent in tank 142 may be reused in the sulfur extraction system 100 or recycled in another manner.

The separated sulfur crystals pass through a line 144 to a washer 146 where the sulfur crystals are placed in contact with a third solvent capable of dissolving the sulfur solvent. For example, the washer 146 may be a sealed tank, and the third solvent may be the same as the second solvent, for example toluene. The wash solution, comprising the third solvent and the sulfur solvent, is conveyed from the washer 146 as indicated at line 150.

This third solvent and sulfur solvent solution may be processed to isolate the solvents. For example, the third solvent and sulfur solvent solution may also be conveyed to the distillation column 152, as indicated at line 150. The isolated third solvent and sulfur solvent may then be reused in the sulfur extraction system 100 or recycled in another manner. The processing to isolate the solvents may occur at the same location as the sulfur extraction system 100 or in another location.

The sulfur crystals may be washed more than once to sufficiently remove lingering solvent. The sulfur crystals are removed from the washer 146 and may be placed in an open area to allow any vestiges of the third solvent wash solution to evaporate. The sulfur crystals may also be exposed to a heat source or a fan in order to facilitate the evaporation of the third solvent solution. The sulfur crystals may be bagged and sold or further processed on-site before sale. For example, the crystals may be milled into a powder, such as a −325 mesh powder, and used in agriculture.

Although the sulfur extraction system 100 has been described to contain the components shown schematically in FIG. 1, the described sulfur extraction system may comprise greater or fewer components such that the extraction process remains true to the described embodiment. For example, large volume extraction may involve more tanks in addition to those described which may function separately or in parallel. The connection lines that have been described serve to transport materials from one part of the system to another and may comprise conveyor belts, pipes, pumps or other means for moving a substance from one location to another. The tanks, filters, washers, crushers, and grinders represent those apparatus known in the art to perform the described functions.

The system 100 and the process 200 can be tuned or adjusted based on the sulfur content of the ore being processed. For example, the process 200 is highly amenable to automation because reactions can be controlled by regulating the temperature. In addition, the size of the ground ore, the ratio of the ore to solvent in the slurry, the temperature of the slurry, the agitation time, and the rate of cooling may be tuned to a particular embodiment.

The sulfur extraction process 200 and the sulfur extraction system 100 can provide nearly 100% recovery of the sulfur contained in the ore and the extracted sulfur crystals consist essentially of 100% pure sulfur. In addition, the solvents used in the extraction process may be recycled or reused in the sulfur extraction process. Recycling these chemical solvents reduces waste, eases disposal concerns, and also reduces production costs.

The system 100 is also an energy saving system. The sulfur extraction process shown schematically by system 100 does not include energy intensive steps common to other sulfur extraction methods, such as generating pressure differentials to induce reactions, pressurizing solutions, or heating solutions to temperatures sufficient to melt or vaporize sulfur. The isolation of sulfur in crystal form also reduces post-processing costs. For example, conventional autoclaving systems extract sulfur in molten form which hardens into large blocks that typically require additional energy intensive processing methods before the sulfur can be sold or used. Sulfur crystals are relatively easy to handle, package, and ground. Thus, the presented method is a cost-effective and efficient method to extract very pure sulfur from low grade sulfur ore, such as sulfur ore from volcanic deposits.

EXAMPLE 1

In a first example embodiment, volcanic sulfur ore with about 35% sulfur content is passed through a system of crushers and grinders. The particle size of the ore is reduced to approximately 50 microns, or a size such that the crushed ore is −200 mesh. A tank of diaryl disulfide is heated to a temperature of approximately 80° C. by circulating hot water through pipes attached to the outside of the tank. The crushed ore is added to the heated diaryl disulfide to form a slurry. The slurry contains about two parts diaryl disulfide and one part sulfur ore, by volume. The slurry is agitated for about thirty minutes per batch to allow the diaryl disulfide to sufficiently dissolve the sulfur in the crushed ore. The slurry is then separated with a vacuum filter centrifuge into a ground rock component and a pregnant solution. The ground rock is washed in a tank with toluene and filtered again to remove the clean ground rock from the toluene and diaryl disulfide mix. The ground rock is discarded and the toluene and diaryl disulfide mix is distilled to isolate the toluene and diaryl disulfide. The toluene and diaryl disulfide are both reused in the sulfur extraction process.

The pregnant solution is cooled in a tank to approximately 40° C. by circulating cold water through pipes attached to the outside of the tank. As the temperature of the solution drops, the sulfur crystallizes and separates from the diaryl disulfide. Once the sulfur has crystallized, the crystals and the remaining solution are pumped out of the tank and the crystals are separated from the diaryl disulfide using a vacuum filter centrifuge. The recovered diaryl disulfide is pumped into a solvent supply tank where it is reused in the sulfur extraction process. The separated sulfur crystals are conveyed to a sealed tank and toluene is introduced into the tank. The toluene dissolves any traces of diaryl disulfide that remain on the sulfur crystals. The toluene and diaryl disulfide mix is pumped out of the tank and distilled to recover the diaryl disulfide and the toluene, which are both reused in the sulfur extraction process. The sulfur crystals are placed in an open area to allow any remaining toluene to evaporate. In this example, about 99% of the sulfur is extracted from the ore and the extracted sulfur crystals are about 100% pure.

EXAMPLE 2

In a second example embodiment, volcanic sulfur ore with about 35% sulfur content is passed through a system of crushers and grinders. The ore is reduced in size such that the crushed ore is −100 mesh. The crushed ore is contacted by a disulfide solution to form a slurry. The disulfide solution comprises about 86% diaryl disulfide and about 14% alkyl aryl disulfide at a temperature of approximately 90° C. The slurry is agitated for less than thirty minutes per batch to allow the disulfide solution to sufficiently dissolve the sulfur in the crushed ore. The slurry is then separated with a vacuum filter centrifuge into a ground rock component and a pregnant solution.

The pregnant solution is cooled in a tank to approximately 25° C. by circulating cold water through pipes attached to the outside of the tank. As the temperature of the solution drops, the sulfur crystallizes and separates from the disulfide solution. Once the sulfur has crystallized, the crystals are separated from the disulfide solution using a vacuum filter centrifuge. The separated sulfur crystals are washed with a toluene solution to sufficiently dissolve any disulfide solution adhering to the sulfur crystals.

In view of the many possible embodiments to which the disclosed principles may be applied, it should be recognized that the illustrated embodiments are only preferred examples and should not be taken as limiting in scope. Rather, the scope is defined by the following claims. We therefore claim all that comes within the scope and spirit of these claims.

I claim:

1. A method for extracting sulfur from sulfur ore, comprising:
   disaggregating sulfur ore from rock;
   crushing the sulfur ore;
   contacting the crushed ore with diaryl disulfide, thereby creating an ore/diaryl disulfide slurry;
   agitating the ore/diaryl disulfide slurry for a time and at a temperature sufficient to dissolve the sulfur;
   recrystallizing the dissolved sulfur; and
   isolating the sulfur crystals.

2. The method of claim 1, further comprising recycling at least a portion of the diaryl disulfide.

3. The method of claim 1, wherein recrystallizing the dissolved sulfur comprises cooling the dissolved sulfur to less than about 50° C.

4. The method of claim 1, further comprising contacting the crushed ore with alkyl aryl disulfide.

5. The method of claim 1, wherein the size of the crushed ore is less than approximately 200 microns.

6. The method of claim 1, wherein the temperature of the slurry is less than approximately 100° C.

7. The method of claim 1, further comprising:
washing the sulfur crystals with toluene, thereby creating a wash solution comprising toluene and diaryl disulfide; and
recycling at least a portion of the toluene and the diaryl disulfide in the wash solution.

8. The method of claim 1, further comprising:
separating a ground rock component from the slurry;
contacting the ground rock component with toluene, thereby creating a rock wash solution comprising toluene and diaryl disulfide;
processing the rock wash solution to isolate the toluene and the diaryl disulfide; and
reusing the toluene and the diaryl disulfide.

9. A method for extracting sulfur from mined sulfur ore, comprising:
contacting crushed sulfur ore with a disulfide oil solution at an elevated temperature sufficient to dissolve sulfur, wherein the elevated temperature is less than a temperature sufficient to melt the sulfur, thereby creating a mixture of sulfur ore and the disulphide oil solution;
cooling the mixture such that sulfur crystals form in the mixture; and
isolating the sulfur crystals.

10. The method of claim 9, wherein the disulfide oil solution comprises diaryl disulfide, alkyl aryl disulfide, or a combination thereof.

11. The method of claim 9, wherein at least a portion of the disulfide oil solution is recycled.

12. The method of claim 9, further comprising:
washing the isolated sulfur crystals with a solvent; and
recycling at least a portion of the solvent.

13. The method of claim 12, wherein the solvent is an organic or an aromatic solvent.

14. The method of claim 12, wherein the solvent is toluene.

15. The method of claim 12, further comprising:
recycling a portion of the disulfide oil as a result of washing the extracted sulfur crystals with a solvent.

16. The method of claim 9, wherein the elevated temperature is less than about 100° C.

17. The method of claim 16, wherein the elevated temperature is between about 85° C. and about 95° C.

18. The method of claim 9, further comprising:
milling the sulfur crystals into a powder.

19. A method for the extraction of sulfur from sulfur ore, comprising:
providing sulfur ore comprising a solid mixture of rock and elemental sulfur;
crushing the sulfur ore;
contracting the crushed sulfur ore with heated diaryl disulfide, thereby creating a slurry;
agitating the slurry for a time and at a temperature sufficient to dissolve the elemental sulfur in the diaryl disulfide;
separating from the slurry a ground rock component and a diaryl disulfide solution containing dissolved sulfur;
contacting the ground rock component with toluene thereby creating a toluene wash solution containing ground rock;
processing the toluene wash solution to isolate toluene and diaryl disulfide such that the toluene and the diaryl disulfide can be recycled;
cooling the diaryl disulfide solution containing dissolved sulfur to a temperature sufficient to crystallize the dissolved sulfur, thereby creating a diaryl disulfide solution containing sulfur crystals;
separating the sulfur crystals from the diaryl disulfide solution and recycling at least a portion of the diaryl disulfide;
containing the sulfur crystals with toluene, thereby creating a toluene wash solution containing sulfur crystals;
extracting the sulfur crystals;
processing the toluene wash solution to isolate diaryl disulfide and toluene; and
recycling at least a portion of the isolated diaryl disulfide and the isolated toluene.

* * * * *